United States Patent

[11] 3,619,601

[72] Inventors Donald Paul Gush
Hyattsville;
Forrest Ashton Wessells, Baltimore, both of Md.

[21] Appl. No. 771,099
[22] Filed Oct. 28, 1968
[45] Patented Nov. 9, 1971
[73] Assignee W. R. Grace & Co.
New York, N.Y.
Continuation-in-part of application Ser. No. 735,588, June 10, 1968.

[54] METHOD AND APPARATUS FOR POSTERIOR PHOTOCURING
11 Claims, 8 Drawing Figs.

[52] U.S. Cl. .......... 240/20, 240/46.07, 355/121, 96/89, 95/35.1
[51] Int. Cl. .......... F21v 9/00, F21v 11/04, G03b 27/04
[50] Field of Search .......... 95/89; 355/112–121; 240/20; 49/29, 30; 117/34; 96/35.1

[56] References Cited

UNITED STATES PATENTS

| | | | |
|---|---|---|---|
| 3,547,730 | 12/1970 | Cohen | 96/35.1 |
| 3,537,853 | 11/1970 | Wessels | 96/35.1 |
| 978,955 | 12/1910 | Stevens | 355/115 |
| 1,040,710 | 10/1912 | Long | 355/121 |
| 1,060,813 | 5/1913 | Brownell | 355/115 X |
| 1,168,622 | 1/1916 | Friedell | 355/115 |
| 2,790,493 | 4/1957 | Wenzelberger | 49/29 |
| 2,138,445 | 11/1938 | Dautzenberg | 195/73 |
| 3,445,166 | 5/1969 | Kloven | 355/121 |

FOREIGN PATENTS

| | | | |
|---|---|---|---|
| 739,987 | 11/1955 | Great Britain | 74 (4)/12 B |
| 355,028 | 7/1961 | Switzerland | 57 C/3 |

*Primary Examiner*—Richard C. Queisser
*Assistant Examiner*—John Whalen
*Attorneys*—Eugene M. Bond and Kenneth E. Prince

ABSTRACT: The disclosed invention is for an apparatus and improvements in a method of operating an apparatus for posterior photocuring a photocurable composition. The apparatus includes a housing having an actinic light source therein and near one end is disposed a platform adapted to receive thereon a supported liquid photocurable composition which has been exposed to actinic light through an image bearing transparency and which is selectively insolubilized in the exposed portions thereof. The invention is especially useful for posterior photocuring a selectively exposed lamination in preparing a developable printing plate from a liquid photocurable composition.

INVENTORS
FORREST A. WESSELLS
DONALD P. GUSH
Eugene M. Bond
ATTORNEY

INVENTORS
FORREST A. WESSELLS
DONALD P. GUSH

Eugene M. Bond
ATTORNEY

INVENTORS
FORREST A. WESSELLS
DONALD P. GUSH

Eugene M. Bond
ATTORNEY

INVENTORS
FORREST A. WESSELLS
DONALD P. GUSH

Eugene M. Bond
ATTORNEY

INVENTORS
FORREST A. WESSELLS
DONALD P. GUSH

Eugene M. Bond
ATTORNEY

INVENTORS
FORREST A. WESSELLS
DONALD P. GUSH

BY Eugene M. Bond
ATTORNEY

INVENTORS
FORREST A. WESSELLS
DONALD P. GUSH

BY Eugene M. Bond
ATTORNEY

METHOD AND APPARATUS FOR POSTERIOR PHOTOCURING

This is a continuation-in-part of application Ser. No. 735,588 filed June 10, 1968.

This invention relates to an apparatus and improvements in a method of operating an apparatus for posterior photocuring a photocurable composition. More particularly, the present invention relates to an apparatus having a housing or frame with an actinic light source disposed therein and near one end is disposed a platform adapted to receive thereon a supported liquid photocurable composition which has been exposed to actinic light through an image bearing transparency and which is selectively insolubilized in the exposed portions thereof.

The present invention provides a method and apparatus for posterior photocuring a composition with a high degree of accuracy and wherein critical operations are performed substantially automatically. The apparatus and method disclosed herein are not only commercially practical but also are highly reliable in routine operation by even semiskilled operators.

Broadly stated, the apparatus of the present invention includes a frame or housing adapted to support near one end thereof an actinic light source and near the other end a platform adapted to receive thereon a supported photocurable composition. Intermediate the light source and the platform is disposed a shutter system to control the time exposure of the photocurable composition to actinic light during posterior photocuring. The photocurable composition is layered in a substantially uniform thickness and upon exposure of the photocurable composition to actinic light projected through an image bearing transparency, the composition becomes selectively insolubilized in the exposed portions thereof and remains substantially liquid in the nonexposed portions thereof. Subsequent to selectively insolubilizing the photocurable composition, the lamination may be defined as including a support surface desirably transparent, over which is disposed a selectively photocured composition portion and a supported uncured liquid composition portion. Because it is recognized that some graduation in photocuring may occur during the selective photocuring step, the lamination is posterior photocured in the apparatus of the present invention. The lamination may be posterior photocured for a controlled period of time to actinic light. The support layer is posterior photocured by positioning the lamination on the platform of the present apparatus and exposing, for a period of time controlled by the shutter means, to actinic light projected through the support layer the selectively insolubilized composition. This procedure avoids any graduation which may appear in the initial selective photocuring step for the section of the composition adjacent the support layer. After the initial controlled posterior photocuring step, the lamination may be defined as comprising a support layer over which is positioned a photocured layer of photocurable composition, over which layer is supported a network of an uncured liquid layer of photocurable compositions and a selectively photocured composition. The exposed surface of the photocurable composition layer may include one portion, i.e. that remaining liquid which may be termed a solubilized portion and a second, i.e. that photocured may be termed an insolubilized portion of the surface. The unexposed liquid of solubilized portion of the photocurable composition layer may be removed by any convenient means. After removal of the unexposed liquid portions, the lamination may be further exposed to actinic light in the post photocuring elements of the present invention through the surface of the selectively photocured composition layer to further posterior photocure the remaining selectively photocured composition to more permanently harden, detackify, and stabilize any portions thereof which may remain partially unphotocured in situ.

The method of the present invention generally provides the steps of applying a substantially uniform layer of liquid photocurable composition to a support surface, positioning the substantially uniform thickness of liquid photocurable composition in exposing position, and exposing the liquid photocurable composition to actinic radiation projected through an image bearing transparency to selectively photocure the liquid composition in only a defined area.

In one embodiment, the method of the present invention provides for projecting actinic radiation through a transparent support surface to photocure a substantially uniform thickness of composition adjacent the support surface. In a second embodiment, the method of the present invention provides for projection of actinic radiation through a selectively photocured lamination which has selectively uncured portions thereof removed and which may include either a transparent or nontransparent support surface.

Although it is recognized that the apparatus and method of the present invention may be used to prepare numerous products of photocurable compositions, this invention will be hereinafter described with regard to the graphic arts and in particular to preparation of a printing plate of a photocurable liquid composition.

The present plates may include relief images of uniform printing height suitable for either direct of indirect use as a printing plate. Printing plates may be thus prepared rapidly and at uniform relief by applying a layer of a liquid photocurable composition to one surface of a solid flexible support having a thickness of about 2 to about 50 mils and being in a substantially flat position, adjusting the thickness of the photocurable composition to obtain a substantially uniform thickness in the range of about 3 to about 250 mils, on said support surface, exposing the photocurable composition to actinic radiation through an image bearing, line or halftone, positive or negative transparency consisting solely of opaque and substantially transparent areas wherein the opaque areas are substantially of the same optical density, said transparency being maintained substantially parallel to the layer of the composition and desirably with an air gap therebetween of about 1 to about 100 mils until substantially complete solidification of the liquid composition takes place in the exposed areas and essentially no solidification takes place in the unexposed areas, if required, exposing the photocurable composition to actinic radiation to photocure a substantially uniform layer thereof adjacent the support surface when transparent, and hereafter removing the liquid photocurable composition in the unexposed areas. Desirably, the unexposed areas are removed by means of an aqueous or solvent bath and the bath may be energized by ultrasonic energy to an ultrasonic energy level in the range of about 18 to about 40 kilocycles/sec. After the uncured portion of the lamination has been removed, the remaining insolubilized photocured composition is desirably exposed to actinic light in the post or second posterior photocuring elements to insure substantially total photocuring of the composition for more permanently hardening, stabilizing or detackifying the layer of photocured composition for avoiding any fracture in the lamination due to weak portions of the composition which may be hardened by additional photocuring on further exposure to actinic radiation.

Practice of the present invention will become more apparent from the following detailed description taken in connection with the accompanying drawings wherein like numerals refer to similar elements throughout the several views.

Figure 1:
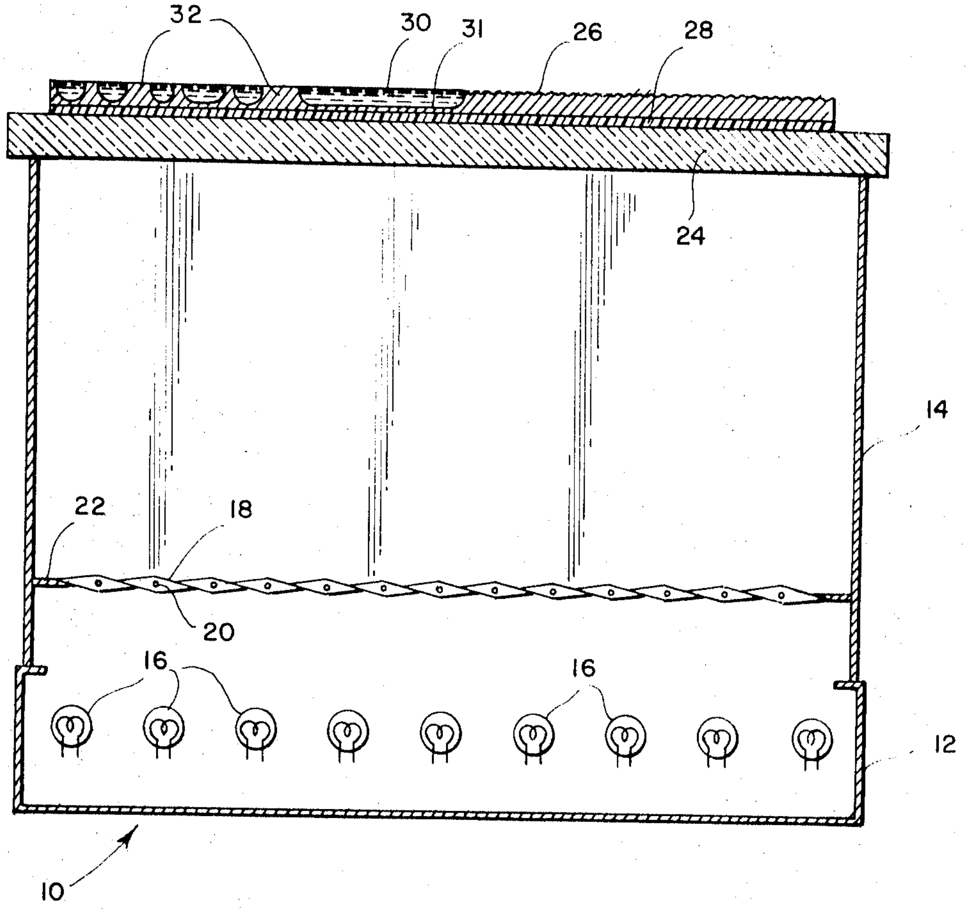
FIG. 1 is a front elevational view generally illustrating an apparatus of the present invention take in half section.

Referring to the drawings wherein similar elements are referred to by similar numerals throughout the several views, FIG. 1 illustrates apparatus 10 having base compartment 12 and upper compartment 14. Disposed within base compartment 12 is actinic light source 16 which appears as a plurality of light elements connected to a power source not shown. Disposed intermediate compartments 12 and 14 is shutter elements 18 rotatable on shafts 20 within support frame 22. A substantially transparent plate 24 is positioned on top of compartment 14 and serves as a platform for lamination 26 having a transparent surface layer 28 over which is disposed a selectively photocured composition 32 and selectively uncured liquid photocurable composition 30. The photocurable composition may be selectively photocured by projecting actinic light through an image bearing transparency. Thereafter, the selectively photocured lamination is placed on platform 24 to posterior photocure a layer 31 adjacent support surface 28. Thus, layer 31 forms an insolubilized boundary adjacent the support surface and tends to eliminate graduation in photocuring which may otherwise result in selectively photocuring the composition by exposure to actinic light projected through an image bearing transparency.

The lower compartment 12 may include various elements required for operation of the apparatus of the present invention as will be described in greater detail hereafter.

Figure 2:
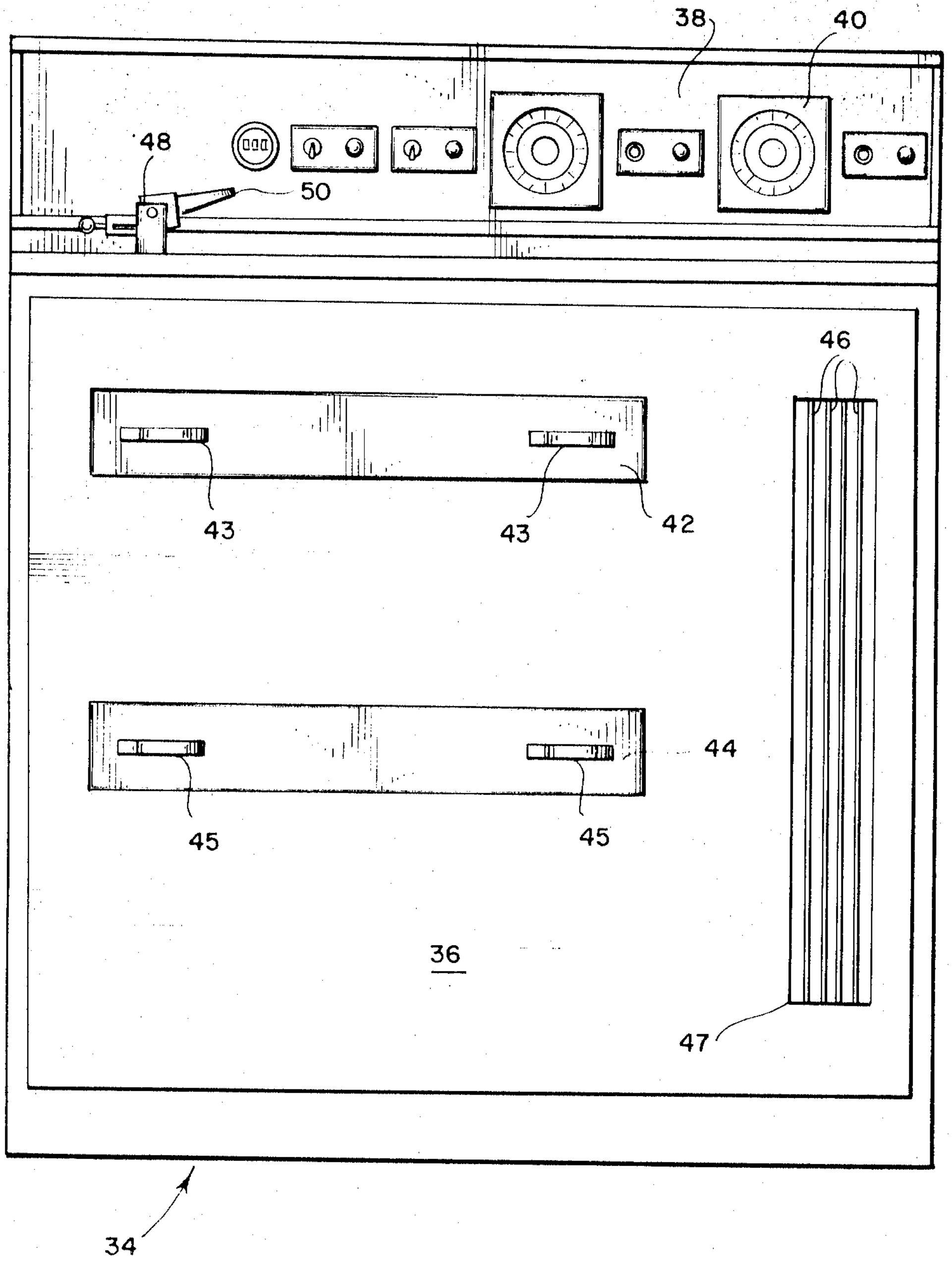
FIG. 2 is a front elevational view generally illustrating the relative locations of elements for the apparatus of this invention.

FIG. 2 illustrates as a perspective view various elements of apparatus 34 of the present invention. The apparatus may include front panel 36 about which the various elements may be mounted and top panel 38 for instruments and controls 40. Door 42 having handle elements 43 and lower door 44 having handle elements 45 are positionable in front panel 36. Storage racks 46 may be included to provide a storage area 47 within the front of panel 36.

Figure 3:
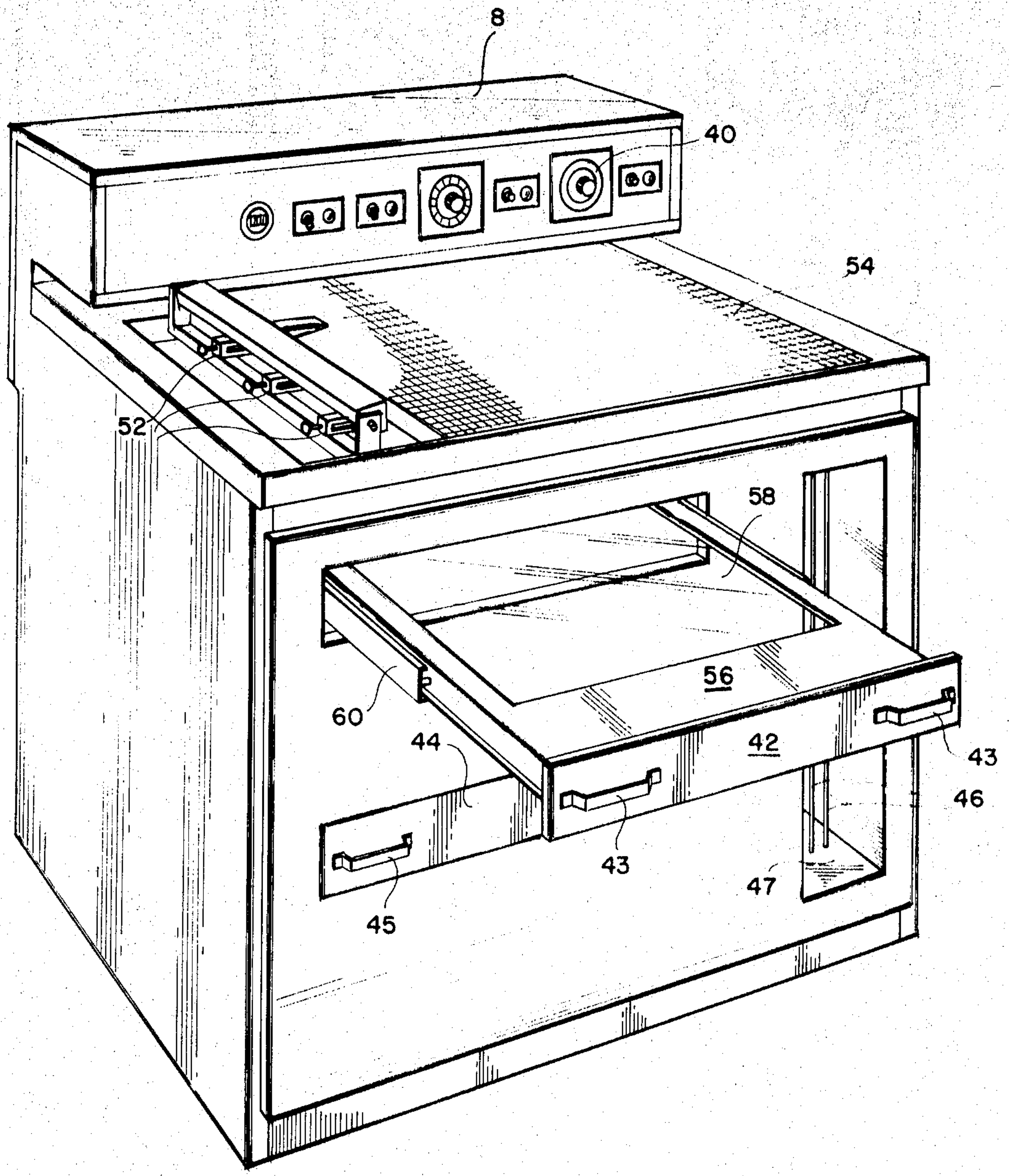
FIGS. 3 and 4 illustrate, in perspective, the apparatus of the present invention.
Figure 4:
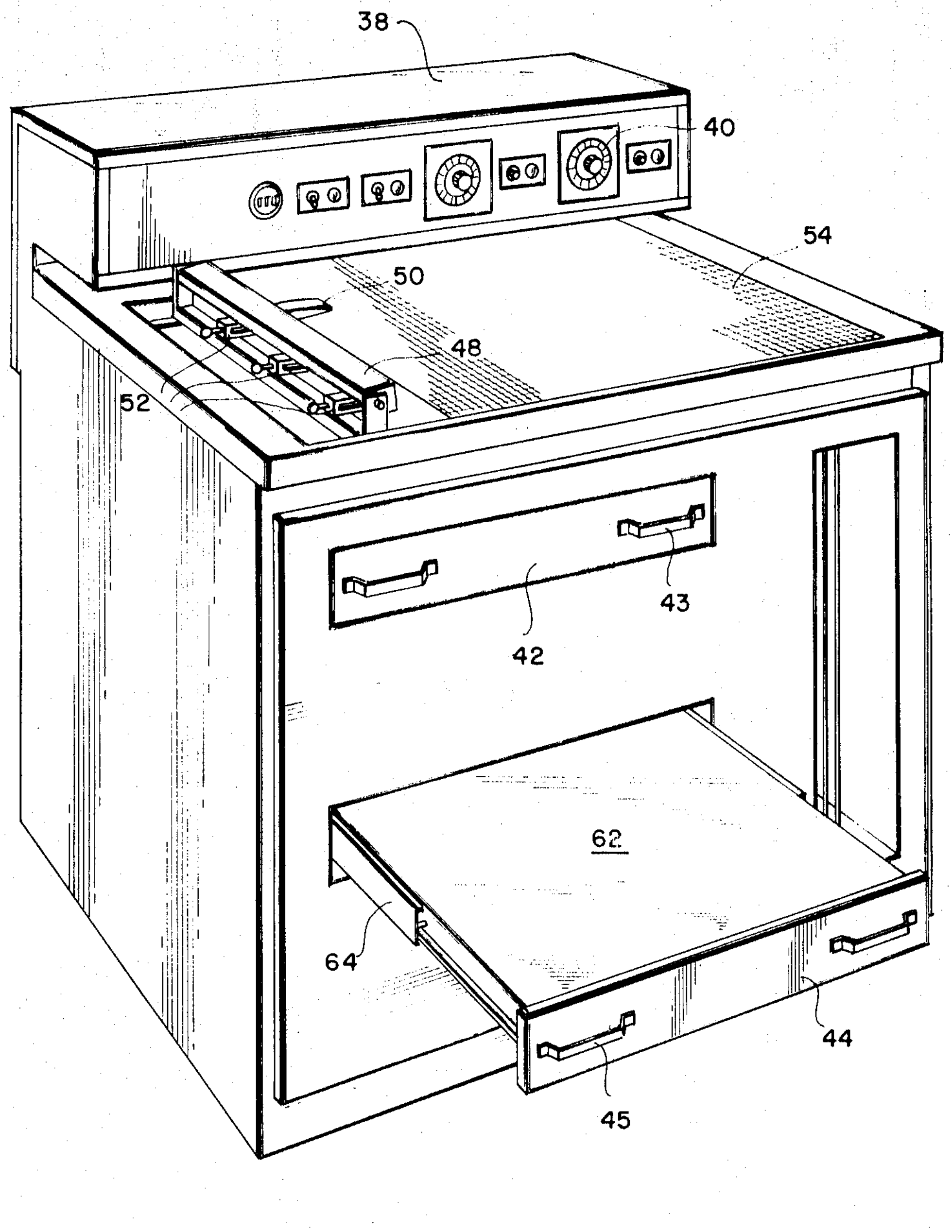

FIGS. 3 and 4 illustrate as a perspective view the apparatus and associated elements described in FIG. 2. The apparatus and associated elements described in FIG. 2 includes hole punch 48 having handle 50 and a plurality of punches 52. The hole punch is disposed on surface 54 of the apparatus and may usefully serve to punch holes in the lamination being processed after posterior photocuring to facilitate handling of the lamination during removal of uncured liquid composition which may be followed by washing and drying as may be required.

The apparatus of FIG. 3 further illustrates shelf 56 as a component of door 42. Shelf 56 may be formed of metal, if desired, and encloses transparent platform 58 desirably formed of glass or the like. The transparent platform is desirably included to serve as a platform through which actinic light may be projected to posterior photocure a lamination of photocurable composition as described herein. Shelf 56 may be slidably mounted into the apparatus by rollers or other suitable means within shelf mount 60 disposed on either side of the shelf. Any suitable track system may be employed to slide the shelf into and out of the body of the apparatus.

The apparatus of FIG. 4 further illustrates bottom shelf 62 as a component of door 44 which may be slidably mounted on a track system 64 in similar fashion as described previously for shelf 56. Bottom shelf 62 is desirably nontransparent and formed of metal sheets for economy reasons. The construction of bottom shelf 62 may, if desired, be formed of any suitable material to serve as a base platform for a second posterior photocuring of a lamination.

Figure 5:
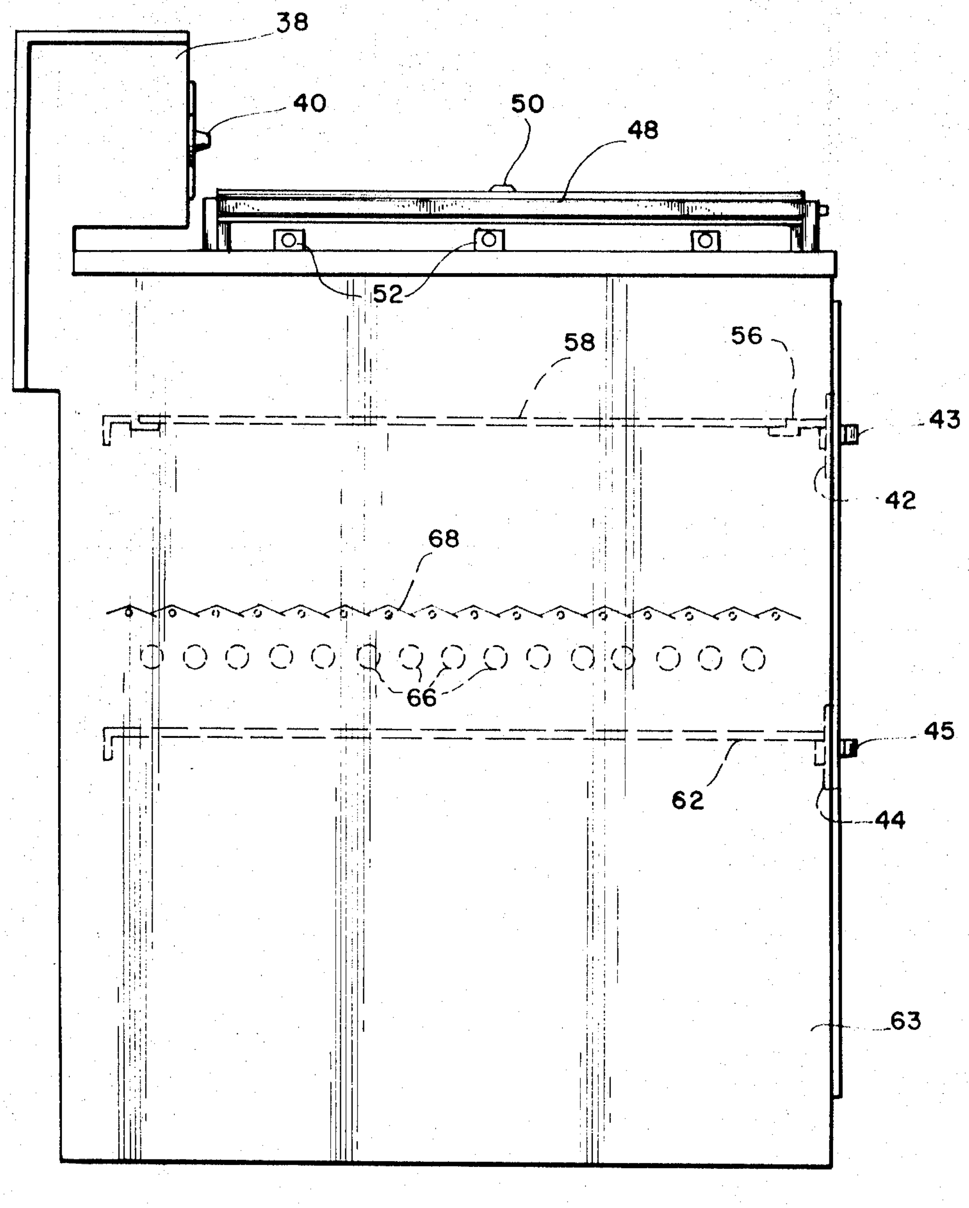
FIG. 5 illustrates as a side elevational view, and embodiment apparatus of this invention with relative location of elements.

FIG. 5 generally illustrates an embodiment for the relative association of elements in the present apparatus. Disposed intermediate shelf 58 and shelf 62 is a series of actinic lights 66 over which is positioned shutter bank 68. As will be described hereinafter, shutter bank 68 is normally closed and may be opened and reclosed by a suitable mechanism which is accurately time dependent. Thus, by this mechanism the posterior photocuring operation may be performed for a predetermined, specific period of time.

Figures 6, 7:
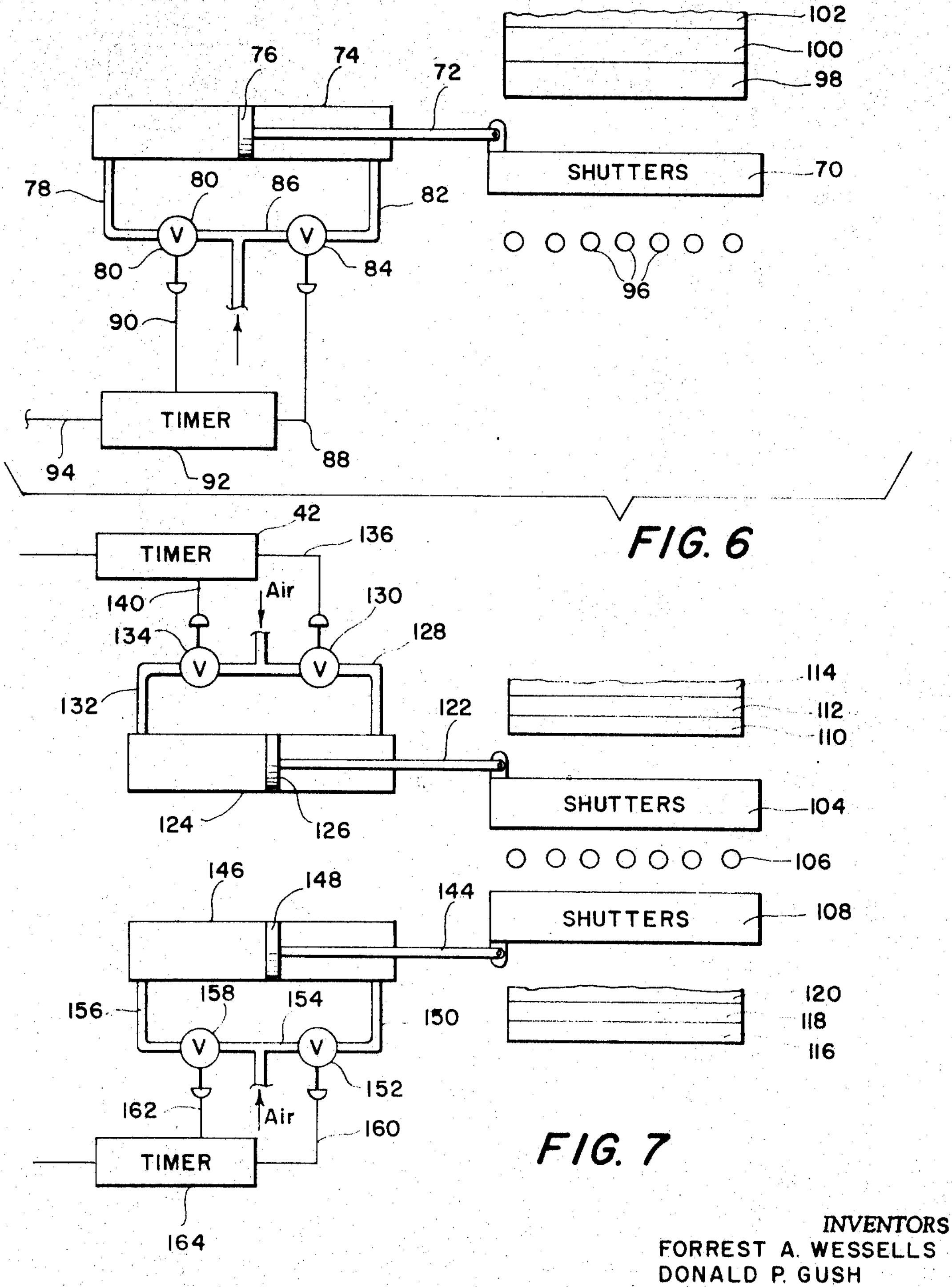
FIG. 6 shows as a general diagrammatical view, a shutter system of the present apparatus.
FIG. 7 shows further as a general diagrammatical view an embodiment shutter system of the present apparatus.

FIG. 6 diagrammatically shows the shutter-light mechanism employed in the embodiment apparatus of FIG. 5. The mechanism includes a bank of shutters 70 operated for opening and closing by lever 72 and piston cylinder 74 having pneumatic operated piston 76 therein. The piston may be conveniently air operated although most any pneumatic system may be employed. Thus, air may be received through line 78 which is controlled by solenoid operated valve 80 to force the piston to the right as illustrated in the figure, and through line 82 controlled by solenoid operated valve 84 in the opposite direction as illustrated. Air to operate piston 76 may be received from a suitable source through line 86. It is recognized that a suitable means is included to relieve air pressure in that portion of the piston cylinder to which the piston is being forced to avoid an internal pressure resistance problem.

Solenoid operated valves 80 and 84 may be controlled through electrical wires 90 and 88, respectively, by timer 92 which receives electrical energy through wire 94.

Illustrated in diagrammatical FIG. 6 is transparent platform 98 having positioned thereon support surface 100 which is transparent to actinic light from source 96, and a support surface 100 is disposed a photocurable composition 102 previously selectively exposed to actinic light through an image bearing transparency.

FIG. 7 diagrammatically shows a second shutter-light mechanism which may be employed in the apparatus of the present invention. The mechanism of FIG. 7 includes a shutter arrangement 104 over actinic light bank 106 below which is a second shutter arrangement 108. Shutter arrangement 104 regulates exposure of actinic light through transparent platform 110 and transparent support surface 112 to posterior photocure photocurable composition 114 which has been previously selectively exposed to actinic light projected through an image bearing transparency.

Shutter arrangement 108 regulates exposure to actinic light toward platform 116 on which is positioned support surface 118 and photocurable composition layer 120 desirably previously posterior photocured through the shutter arrangement 104.

Shutter arrangement 104 may be operated in similar fashion to that of FIG. 6 by lever 122 and piston cylinder 124 having pneumatic-operated piston 126 therein. Air to operate piston 126 may be received either through line 128 controlled by solenoid operated valve 130, or through line 132 controlled by solenoid operated valve 134. Solenoid valves 130 and 134 may receive electrical signals through wires 136 and 140, respectively, from timer 142.

Shutter arrangement 108 may be also operated in similar fashion to that of FIG. 6 by lever 144 and piston cylinder 146 having pneumatic-operated piston 148 therein. Air to operate piston 148 may be received either through line 150 controlled by solenoid-operated valve 152, or through line 156 controlled by solenoid-operated valve 158. Solenoid valves 152 and 158 may receive electrical signals through wires 160 and 162, respectively, from timer 164.

Figure 8:
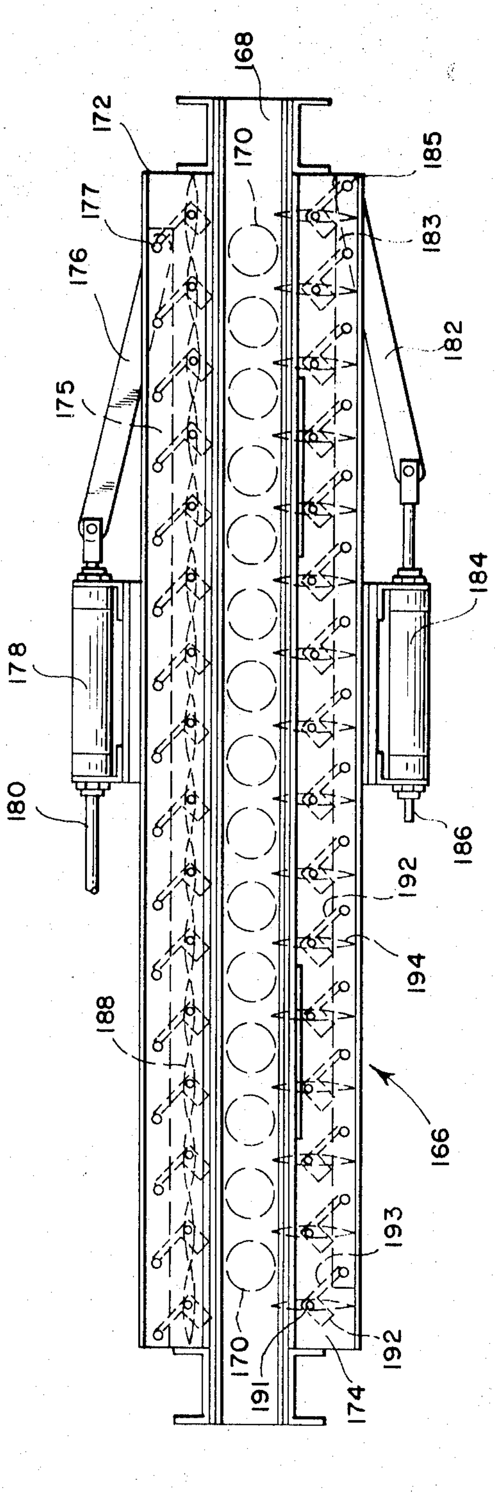
FIG. 8 shows as a side elevational view a shutter system useful in the present apparatus.

FIG. 8 illustrates, as a half-section side elevational view a useful shutter mechanism 166 for use in the specific representation of FIG. 7 and which may be applied to the representation of FIG. 6 with slight modification. The shutter mechanism 166 includes base frame 168 wherein is disposed a plurality of actinic lights 170. On one side of base frame 168 is housing 172 and oppositely disposed thereto is lower housing 174. Housing 172 includes rocker bar 175 driven by arm 176 and piston cylinder 178 having piston rod 180 projecting therefrom. Arm 176 is joined for pivotal movement to rocker bar 175 by pin 177. Housing 174 on the other hand includes rocker bar 183 driven by arm 182 and piston cylinder 184 having rod 186 projecting therefrom. Arm 182 is joined for pivotal movement to rocker bar 183 by pin 185.

Housing 172 further includes a series of shutters 188 desirably overlapping to restrict light from source 170 from projecting therethrough. Shutters 188 may be formed simply by joining two elongated strips of metal, plastic or the like at the edges about an axle wire to form a bowed construction. The axles wires may then be fixed in position and rotated by movement of linkage 190 joined to rocker bar 175. Similarly, shutters 194 may be formed and operated through linkage 192 joined to rocker bar 183.

Linkages 192 may include block 190 which receives axle 191 for rotation thereof. Block 190 is joined to lever arm 193 and pivotally secured through pin 194 to rocker arm 183. Because the series of axles 191 are fixed in position for rotation, it becomes apparent that rocker arm moves in a slight horizontal to vertical arc during movement by the pistons for either opening or closing the shutters.

A convenient method of carrying out this invention is to place an image-bearing, line or halftone, stencil or positive or negative transparency parallel to the surface of a layer of a photocurable composition which has been cast directly on a support. The image-bearing transparency and the surface of the composition may be in contact or have an air gap therebetween, as desired. The photocurable layer is exposed through the transparency to a source of actinic light, preferably a point or collimated light source when a liquid photocurable composition is used, until the layer is cured or polymerized to an insoluble stage in the exposed areas. The thickness of the ultimate relief in such a method may be controlled by varying the thickness of the layer of the composition. The thus cured plate is then posterior photocured by controlled exposure through the transparent support layer to photocure a layer of composition adjacent the support layer. Desirably, the posterior photocuring has an exposure time of about 0.1 to about 60 seconds depending upon the transparency of the layers to actinic light and the degree of thickness in the layer desired. Preferably, the period of exposure is about 10 to about 25 seconds. The surface network of the composition layer of the resulting lamination includes areas of liquid uncured composition and areas of insolubilized photocured composition. The liquid areas are next removed by immersion of the lamination in an aqueous solution of a detergent in a bath and the bath may be ultrasonically activated to the degree necessary to cause cavitation in the bath. Thereafter, the photocured printing plate is washed in a spray of water and dried in an air dryer. Following the drying operation, the resulting lamination may then be exposed to the second posterior photocuring operation by further exposure to actinic light which finally hardens the composition as previously described. The second posterior photocuring may have an exposure time of about up to 20 minutes with an exposure time of about 1 to about 5 minutes being preferred and usually sufficient.

One photocurable system which is suitable for use herein is that set out in a copending application having U.S. Ser. No. 674,773 filed Oct. 12, 1967, assigned to the same assignee hereof and incorporated by reference herein. In this photocurable system a printing plate is formed from a layer of a photocurable polymeric composition consisting of a polyene containing at least two unsaturated carbon to carbon bonds per molecule, a polythiol containing two or more thiol groups per molecule and a photosensitizer. The layer of photocurable polymeric composition may be adhered to a support such as one formed of rubber, plastic, paper, glass, metal and the like.

As used therein polyenes and polyynes refer to simple or complex species of alkenes or alkynes having a multiplicity, i.e., at least two, "reactive" carbon to carbon unsaturated functional groups per average molecule. For example, a diene is a polyene that has two "reactive" carbon to carbon double bonds per average molecule, while a diyne is a polyene that contains in its structure two "reactive" carbon to carbon triple bonds per average molecule. Combinations of "reactive" double bonds and "reactive" triple bonds within the same molecule are also operable. An example of this is monovinylacetylene, which is a polyeneyne. For purposes of brevity all these classes of compounds will be referred to herein as polyenes.

As used herein the term "reactive" unsaturated carbon to carbon groups means groups which will react under proper conditions as set forth herein with thiol groups to yield the thioether linkage $$(-\overset{|}{\underset{|}{C}}-S-\overset{|}{\underset{|}{C}}-)$$

, as contrasted to the term "unreactive" carbon to carbon unsaturation which means $$-\overset{|}{C}=\overset{|}{C}-$$

groups when found in aromatic nuclei (cyclic structures exemplified by benzene, pyridine, anthracene, tropolone and the like) which do not under the same conditions react with thiols to give thioether linkages. Products from the reaction of polyenes with polythiols which contain two or more thiol groups per average molecule are called polythioether polymers or polythioethers.

One group of operable polyenes to react with polythiols to form printing plates is that taught in a copending application having Ser. No. 617,801 filed Feb. 23, 1967 and assigned to the same assignee. This group includes those materials having a molecular weight in the range 300 to 20,000, a viscosity ranging from 0 to 20 million centipoises at 70° C. of the general formula: $[A]-(X)_m$ wherein X is a member of the group consisting of $$R-\overset{R}{\overset{|}{C}}=\overset{R}{\overset{|}{C}}- \quad \text{and} \quad R-C\equiv C-$$

; m is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of operable polyenes from this group include, but are not limited to 1. crotyl-terminated polyurethanes which contain two "reactive" double bonds per average molecule in a near terminal position of the average general formula:

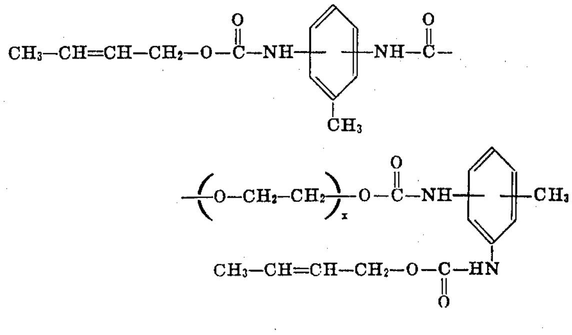

wherein $x$ is at least 1, 2. ethylene/propylene/nonconjugated diene terpolymers, such as "Nordel 1040" manufactured by duPont which contains pendant "reactive" double bonds of the formula:

$$-CH_2-CH=CH-CH_3$$

3. the following structure which contains terminal "reactive" double bonds:

$$CH_2=CH-CH_2-O-\underset{\underset{O}{\|}}{C}-\left(CH_2-\underset{CH_3}{\overset{CH_3}{\overset{|}{\underset{|}{C}}}}\right)_x-\underset{\underset{O}{\|}}{C}-O-CH_2-CH=CH_2$$

where $x$ is at least 1.

4. the following structure which contains near terminal "reactive" double bonds:

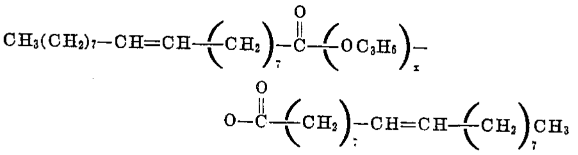

where $x$ is at least 1.

Another group of operable polyenes includes unsaturated polymers in which the double or triple bonds occur also within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, poly-amides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like. Included in the term "-polyenes" as used herein are those materials which in the presence of an inert solvent, aqueous dispersion or plasticizer fall within the viscosity range set out above at 70° C.

A third group of operable polyenes includes those polyenes in which the reactive unsaturated carbon to carbon bonds are conjugated with adjacent unsaturated groupings. Examples of operable reactive conjugated ene systems include but are not limited to the following:

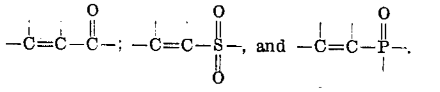

A few typical examples of polymeric polyenes which contain conjugated reactive double bond groupings such as those described above are polyethylenether glycol (600 M.W.) diacrylate; polytetramethylenether glycol (1,000 M.W.) dimethacrylate; the triacrylate of the reaction product of trimethylol propane with 20 moles of ethylene oxide; and the like.

As used herein, the term polythiols refers to simple or complex organic compounds having a multiplicity, i.e. at least 2, of pendant or terminally positioned —SH functional groups per average molecule.

On the average the polythiols must contain two or more —SH groups/molecule. They usually have a viscosity range of 0 to 20 million centipoises at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The operable polythiols may be exemplified by the general formula: $R_8—(SH)_n$ where $n$ is at least two and $R_8$ is a polyvalent organic moiety free from "reactive" carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any "reactive" carbon to carbon unsaturation.

One class of operable polythiols with polyenes to obtain essentially odorless cured polythioether printing plates are esters of thiol-containing acids of the general formula: $HS–R_9–COOH$ where $R_9$ is an organic moiety containing no "reactive" carbon to carbon unsaturation with polyhydroxy compounds of the general structure: $R_{10}—(OH)_n$ where $R_{10}$ is an organic moiety containing no "reactive" carbon to carbon unsaturation and $n$ is two or greater. These components will react under suitable conditions to give polythiol having the general structure:

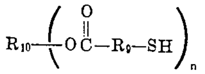

where $R_9$ and $R_{10}$ are organic moieties containing no "reactive" carbon to carbon unsaturation and $n$ is two or greater.

Certain polythiols such as the aliphatic monomeric polythiols (ethane dithiol, hexamethylene dithiol, decamethylene dithiol, tolylene-2,4-dithiol, etc.) and some polymeric polythiols such as a thiol-terminated ethycyclohexyl dimercaptan polymer, etc. and similar polythiols which are conveniently and ordinarily synthesized on a commercial basis although having obnoxious odors, are operable in this invention. Examples of the polythiol compounds preferred because of their relatively low odor level and fast curing rate include but are not limited to esters of thioglycolic acid ($HS–CH_2COOH$),α-mercaptopropionic acid $HS–CH(CH_3)–COOH$ and β-mercaptopropionic acid $HS–CH_2CH_2COOH$) with polyhydroxy compounds such as glycols, triols, tetraols, pentaols, hexaols, etc Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification. The preferred polythiol compounds are characterized by low level of mercaptan-like odor initially, and after reaction, give essentially odorless cured polythioether end products which are commercially useful resins or elastomers for printing plates.

As used herein the term "odorless" means the substantial absence of the well-known offensive and sometimes obnoxious odors that are characteristic of hydrogen sulfide and the derivative family of compounds know as mercaptans.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality ($f$) of three. A dithiol is a polythiol with an average of two thiol groups per molecule and thus has a functionality ($f$) of two.

It is further understood and implied in the above definitions that in these systems, the functionality of the polyene and the polythiol component is commonly expressed in whole numbers although in practice the actual functionality may be fractional. For example, a polyene component having a nominal functionality of two (from theoretical considerations alone) may in fact have an effective functionality of somewhat less than two. In an attempted synthesis of a diene from a glycol in which the reaction proceeds to 100 percent of the theoretical value for complete reaction, the functionality (assuming 100 percent pure starting materials) would be 2.0. If, however, the reaction were carried to only 95 percent of theory for complete reaction, about 10 percent of the molecules present would have only one ene functional group, and there may be a trace of material that would have no ene functional groups at all. Approximately 90 percent of the molecules, however, would have the desired thylene structure and the product as a whole then would have an actual functionality of 1.9. Such a product is useful in the instant invention and is referred to herein as having a functionality of two.

The aforesaid polyenes and polythiols may, if desired, be formed or generated in situ and still fall within the scope of the instant invention.

To obtain the maximum strength, solvent resistance, creep resistance, heat resistance and freedom from tackiness, the reaction components consisting of the polyenes and polythiols are formulated in such a manner as to give solid, cross-linked, three-dimensional network polythioether polymer systems on curing. In order to achieve such infinite network formation, the individual polyenes and polythiols must each have a functionality of at least two and the sum of the functionalities of the polyene and polythiol components must always be greater than four. Blends and mixtures of the polyenes and the polythiols containing said functionality are also operable herein.

In general, it is preferred, especially at or near the operable lower limits of functionality in the polyene and polythiol, to use the polythiol and the polyene compounds in such amounts that there is one thiol group present for each ene group, it being understood that the total functionality of the system must be greater than four, and the functionality of the thiol and the diene must each be at least two. For example, if 2 moles of a triene are used, and a dithiol is used as the curing agent, making the total functionality have a value of five, it is preferable to use 3 moles of the dithiol. If much less than this amount of the thiol is used, the curing rate will be lower and the product will be weaker in some respects because of the reduced cross-link density. If much more than the stoichiometric amount of the thiol is used, the rate of cure may be higher, if that is desirable, although excessive amounts may lead to a plasticized cross-linked product which may not have the desired properties. However, the relative amounts of polyenes and polythiols may be adjusted to any values above the minimum scope disclosed herein which give desirable properties to the cross-linked polythioether. It must be emphasized that regardless of the ratio of polythiol to polyene, the total functionality of the system must be greater than four, or a cross-linked network will not result, and the product will be a swellable, chain-extended composition which is unsuitable. Thus, to obtain a solid cross-linked printing plate it is necessary to use a polyene containing at least two reactive unsaturated carbon to carbon bonds per molecule in an amount that the combined functionality of the reactive unsaturated carbon to carbon bonds per molecule and the thiol groups per molecule is greater than four.

Another composition operable to form a relief printing plate by the process of the instant invention is that set out in British Patents 1,101,910 and 1,007,345. Therein the liquid composition consisting of:

A. 0.001 to 5 percent by weight of a polyboron acid salt of the formula $M'_2(B_nH_{n1p1q}X_pY_q)_{m'}$ (I) wherein M' is a silver (I) or cerium (III) cation, X is halogen; Y is a hydroxyl group, or a hydrocarbyloxyalkoxy or hydrocarbylcarbonyl group free of aliphatic unsaturation and containing at most twelve carbon atoms; $n$ is ten or twelve; $p$ is one to twelve and is equal to $n$ minus $q$ when $q$ is greater than zero; $q$ is 0 to 2, $p+q$ being at most equal to $n$; and $m'$ is the valence of M' (when $p$ is greater than 1, the halogens represented by X may be the same or different);

B. a halide promoter in which the halogen is chlorine, bromine or iodine and which is dissociable by actinic light of wavelength between 2,500 A; and 7,000 A; and C. at least one substance capable of undergoing cationic polymerization is cationically polymerized on exposure to actinic light having a wavelength in the range 2,500 to 7,000 A. Thus, in carrying out the process in the instant invention any liquid photosensitive composition capable of being photopolymerized or photocured or both upon exposure to actinic radiation to a solid polymer is operable to form a relief printing plate.

Another liquid photocurable composition useful to form printing plates is that set out in French patent No. 1,471,432. Generally, liquid photosensitive compositions disclosed in this patent comprise as essential constituents, an unsaturated polyester, an ethylenically unsaturated monomer leading itself to a reaction of addition polymerization, and a photosensitizer. The unsaturated polyester may be produced from an alcohol monomer containing at least a polyol comprising at least five ether-oxygen radicals linked to carbon atoms in its main chain and not having more than three carbon atoms between the ether-oxygen radicals, and a monomer of acidic character containing at least an unsaturated dicarboxylic acid and/or one of its derivatives.

The liquid photocurable compositions to be converted to printing plates may, if desired, include such additives as antioxidant, accelerators, dyes, inhibitors, activators, fillers, pigments, antistatic agents, flame-retardant agents, thickeners, thixotropic agents, surface-active agents, light-scattering agents, viscosity modifiers, extending oils, the like. The aforesaid detackifiers and the like. Such additives are usually preblended with the monomer or compound to be photopolymerized or with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.005 to about 300 parts on the same basis. Each additive must be present in an amount which will not interfere with or inhibit the necessary photocuring or photopolymerization image producing reaction or other required steps in the plate-making process.

Additionally, in liquid photosensitive compositions which are photocured, chemical photoinitiators or sensitizers such as benzophenone, acetophenone, acenapthene-quionone, methyl ethyl ketone, thioxanthen-9-one, xanthen-9-one, 7-H-Benz [de] anthracen-7-one, dibenzosuberone, 1-naphthaldehyde, 4,4'-bis (dimethylamino) benzophenone, 9-one, 1'-acetonaphthone, 2'-acetonaphthone, 2,3-butanedione, anthraquinone, 1-indanone, 2-tert.-butyl anthraquinone, valerophenone, hexanophenone, 8-phenylbutyrophenone, p-mor pholinopropiophenone, 4-morpholinobenzophenone, 4'-morpholinodeoxybenzoin, p-diacetyl benzene, 4-aminobenzophenone, 4'-methoxyacetophenone, benzaldehydeα-tetralone, 9-acetylphenanthrene, 2-acetylphenanthrene, 10-thioxanthenone, 3-acetylphenanthrene, 3-acetylinodole 1,3,5-triacetylbenzene, etc. and blends thereof, to greatly reduce the exposure times and thereby when used in conjunction with various forms of energetic radiation yield with yield very rapid, commercially practical cures. The curing rate accelerators are usually added in an amount ranging from about 0.0005 to about 10 percent by weight of the photocurable composition.

Curing inhibitors or retarders operable include but are not limited to hydroquinone, P-tert-butyl catechol; 2,6-ditert-butyl-p-methylphenol; phenothiazine and N-phenyl-2-napthylamine.

The thickness of the layer of the liquid photocurable composition employed depends on the thickness desired in the relief image and on the alignment between the relief figures. That is, if the printing areas are closely aligned less relief is necessary than if the printing areas are further apart. This is to assure that the nonprinting areas are not contacted with the surface of the material on which the printing is to occur. In the case of photosensitized halftones, the screening used must be taken into consideration when selecting the proper thickness. In general, the thickness of the layer to be solidified and employed as a printing plate may vary from 3 to 250 mils or more. For letterset (dry offset) plates, the thickness may be customarily in the 3 to 25 mil range; for letterpress printing, thicknesses of 10 to 500 mils are common. For letterpress newspaper or magazine printing plates, the thickness of the photosensitive layer will be about 10 to about 50 mils. Thicker layers are sometimes employed for the flexographic printing of designs and relatively large areas with letterpress printing plates. Thus, in general, the thickness of the liquid photosensitive composition employed as a printing plate can vary from 0.1 to 500 mils or more.

The support to which the photosensitive composition is adhered may be formed from various materials such as rubber, plastic, paper, glass, metal and the like. The support is preferably a plastic having the characteristics of being flexible, adherable to the photosensitive composition on exposure to actinic radiation or by other means and capable of transmitting a substantial amount of the radiation therethrough. The thickness of the support is dependent on its relative strength and dimensional stability to hold a specified thickness of the photosensitive composition and may be empirically determined by one skilled in the art. For example when an oriented polyethylene terephthalate in film form sold under the trade name "Mylar" is employed as the support and a 20 mil relief is desired, the "Mylar" film will have a thickness of about 1 to 10 mils. Nonactinic radiation transmitting metal plates such as aluminum for the same thickness of photocurable composition usually have a thickness of about 1 to 8 mils.

The photocurable reaction may be initiated by actinic radiation from sunlight or from special light sources which emit significant amounts of actinic light suitably in the wavelength range of 2500–7000 A. For liquid photocurable compositions it is preferred that the light emanate from a point source or in the form of parallel rays. However, divergent beams are also operable under certain circumstances as a source of actinic light. Thus it is possible merely to expose the liquid photocurable composition to actinic radiation, preferably in the range 3,000–4000 A., under ambient conditions or otherwise and obtain a solid elastomeric or resinous product useful as a printing plate material after development.

The actinic light source is activated so as to radiate actinic light through the image-bearing transparency onto the exposed portion of the liquid photocurable composition thereby solidifying the exposed portion. The UV wavelength operable to produce printing plates in the apparatus of the invention is in the range 2,500–4,000 A. Various light sources may be used to obtain sufficient UV light to operate the instant apparatus as desired. Such sources include but are not limited to, carbon arcs, mercury arcs, fluorescent lamps with special ultraviolet-light-emitting phosphors, xenon arcs, argon glow lamps and photographic flood lamps. Of these, the mercury vapor arcs, particularly the sun lamp type and the xenon arcs are very useful. The sun lamp mercury vapor arcs are customarily used at a distance of 7 to 10 inches from the liquid composition, whereas the xenon arc is placed at a distance of 24 to 40 inches from the liquid layer. With a more uniform extended source of low intrinsic brilliance, such as a group of contiguous fluorescent lamps with special phosphors, the liquid photocurable composition may be exposed within an inch of the lamp. The lamp to plate distance is found to depend upon several variable including light intensity, collimation of rays and the like.

It is important to select the correct exposure time in employing the apparatus of the instant invention. That is, in making printing plates, it is essential that the exposure be sufficient to harden the photocurable composition in the exposed image areas without causing hardening in the nonimage areas. Aside from the exposure time and the light intensity, the extent of the exposure is dependent on the thickness of the liquid layer, the temperature, the presence of light absorbing pigments or dyes in the liquid composition and the character of the image to be reproduced. In general, the thicker the layer of the liquid composition the longer the exposure time. It has been observed that hardening starts at the surface of the liquid layer closest to the light source and proceeds downward to the support. With insufficient exposure, the layer may have a hard surface but, through lack of a clear through hardening the relief will be removed when the unexposed area is removed in development i.e. washing. When the hardening rate increases at higher temperatures, less exposure may be required thereat than at room temperature. However care must be exercised that too high a temperature is not obtained during exposure to an actinic light, as this lead to, in some cases, thermal expansion of the liquid composition which results in image distortion. It is preferred that the actinic light radiation be carried out at a temperature in the range of 20°–70° C. Due to the number of variables which affect exposure time, optimum results are best obtained by trial and error with characterization after each exposure. The actinic light may be applied to the liquid composition for periods ranging from 1 second to 20 minutes. Printing plates from liquid compositions may also be prepared by the instant apparatus by projecting the actinic light through a suitable lens system. The employment of a spacer between the liquid composition layer and the image-bearing transparency facilitates removal of the hardened photocured composition from the image-bearing transparency after it has been exposed to actinic light. The spacers are merely employed to maintain an airgap between the liquid photosensitive composition and the image bearing transparency and said airgap can range from 0.1 to 250 mils or more.

The solvent employed for washing (i.e. developing the relief image) of the printing plate made from the liquid composition is primarily a diluent which reduces the viscosity of the unexposed liquid composition so that it is easily removed. Removal may be speeded up by blotting the unexposed area with a sponge and the like. The washing liquid is selected so that it is readily miscible with or emulsified with the unexposed liquid composition yet has little action on the exposed hardened image or the support layer. The solvent employed for washing will depend on the liquid composition and includes, but is not limited to water, water and a detergent and/or soap, mixtures of alcohols e.g. methanol and/or ethanol with or without ethyl, methyl, or propyl acetate. Other solvents with high evaporation rates are well known to those skilled in the art. It should be noted herein that the term "solvent" includes not only organic solvents but also water and other aqueous systems wherein the unexposed liquid composition is soluble (including dispersible) in said systems and the exposed liquid portion is not so affected. In those instances where the liquid composition is acidic or basic, the printing relief may be developed by dissolving or dispersing the unexposed areas in an aqueous system of the opposite polarity i.e. to use an aqueous acidic solvent system with a basic liquid composition and vice versa. The solvent can be applied by a sponge, brush, blotter or by means of jets or sprays. If desired, a porous, absorbent material may be used without a solvent in which case the unreacted liquid is removed mechanically.

The following examples will aid in explaining, but should not be deemed as limiting, the instant invention. In all cases unless otherwise note, all parts and percentages are by weight.

EXAMPLE 1

To a liter flask equipped with stirrer, thermometer and gas inlet and outlet was charged 450 g. (0.45 moles) of polytetramethylene ether glycol, having a hydroxyl number of 112 and a molecular weight of 1,000, along with 900 g. (0.45 moles) of polytetramethylene ether glycol having a hydroxyl number of 56 and a molecular weight of 2,000, both commercially available from Quaker Oats Co. The flask was heated to 110° C. under vacuum and nitrogen and maintained thereat for 1 hour. The flask was then cooled to approximately 70° C. whereat 0.1 g. of dibutyl tin dilaurate was added to the flask. A mixture of 78 g. (0.45 moles) of tolylene diisocyanate and 78 g. (0.92 moles) of allyl isocyanate was thereafter added to the flask dropwise with continuous stirring. The reaction was maintained at 70° C. for 1 hour after addition of all the reactants. The thus formed allyl terminated polymer will hereinafter be referred to as Polymer A.

EXAMPLE 2

A liquid photocurable composition was prepared by mixing 102.3 g. of Polymer A from example 1 herein, 7.7 g. of pentaery-thritol tetrakis (β-mercaptopropionate), 1.5 g. benzophenone and 0.1 g. of 2,6 -diteritiary-buty-methyl phenol. The mixture was heated to 70° C. to dissolve the benzophenone and produce a clear homogeneous mixture. A sheet of "Mylar" 4 mil thick film was placed on an adjustable flat table and a portion of the photocurable composition at a temperature of 70° C. was poured on the "Mylar" support. The liquid photocurable composition was distributed evenly over the support by means of a doctor blade to a uniform thickness of 20 mils on top of the 4 mil "Mylar" support. Shims were placed around the edge of the support to maintain an airgap of 12 mils between the surface of the liquid curable composition and a test negative of a combination of an 85 line halftone, standard type and reverse type, 65 line gray scale and a solid area. The negative was adhered to a glass plate to maintain it parallel to the surface of the liquid photocurable composition. The photocurable composition was exposed through the glass plate and negative to light from an 8,000 watt Ascorlux pulsed xenon arc printing lamp commercially available from American Speed Light Co. placed 54 inches above the plate. The exposure was for about 2 minutes during which time the liquid photocurable composition solidified in the image areas. The nonimage areas remained a liquid essentially of the same viscosity as prior to exposure to actinic light.

The photocured printing plate was back exposed and cured through its "Mylar" support by a 9 lamp bank of GEF24T12 black light high output tubes at a distance of 21 inches therefrom for about 15 seconds to more firmly adhere the photosensitized composition to the support and form a solid 1 mil layer of the photosensitized composition on the support.

The photocured printing plate with a latent image thereon was transferred to an aqueous bath maintained at 170° F. containing 2 percent by weight of a commercially available detergent sold under the trade name "DuBois TK" by DuBois Chemical Co., Cincinnati, Ohio. The bath was ultrasonically activated to produce cavitation in the bath by means of 3 transducers (each 1 kilowatt) on the bottom of the bath connected to separate generators, each energized at about 21 kc./sec. After 1 ½ minutes in the bath, the printing plate was removed therefrom. The resultant etched plate was completely clear of uncured liquid polymer and had a solid relief image of 20 mils in depth in the exposed photocured line image areas of the plate. The relief was sharp with complete recesses in the bowls of letters such as *o*, *p*, etc. and the image areas had smooth surfaces and shoulders. To further harden the image and prepare it for printing, the plate was post cured for 2 minutes at a distance of 3 inches from a 4,000 -watt Ascorlux pulsed xenon arc printing lamp commercially available from American Speed Light Co. Thereafter the glossy plate was inked and employed in letterpress printing on a Davidson Press Model 816 manufactured by Davidson Corp., Chicago, Illinois. The lines were distinct and separate and the dots in the halftone area had excellent definition.

The printing plates etched by the instant invention can be employed in various types of printing plates including, but not limited to intaglio printing, lithographic printing, letter-press printing, dry offset printing, flexographic printing and the like.

The various elements of the present apparatus unless otherwise indicated, may be secured to adjoining elements by any suitable means such as bolts, welding, rivets or the like. In addition, auxiliary support or reinforcement members may also be included as part of the apparatus where required.

Although a preferred embodiment of the invention has been illustrated herein, it is to be understood that various changes and modifications may be made in the construction and arrangement of elements without departing from the spirit and scope of the invention as defined.

WHAT IS CLAIMED IS: What is claimed is: for posterior photocuring a photocurable composition which comprises in combination, a frame having a first and a second compartment, said second compartment adapted to support an actinic light source, and said first compartment having near one end actinic light-transparent platform supporting a photocurable composition, said photocurable composition being of a substantially uniform thickness and having both soluble and insoluble portions, means for supplying actinic radiation through said platform said radiation having an intensity which is substantially uniform across the entire surface of said composition to the liquid photocurable composition to insolubilize a layer portion thereof adjacent the transparent layer and thereby form solid connections between said insoluble portions to a thickness less than the substantially uniform thickness of photocurable composition whereby a portion of photocurable composition remains liquid near the surface opposite the transparent layer, and shutter means disposed intermediate said actinic radiation means and said platform to control the time of exposure of projected radiation and permit formation of said insolubilized layer.

2. The apparatus of claim 1 wherein the shutter means includes a plurality of parallel rotatable members open and closed by a pneumatic operated piston controlled by a timer which regulates the time during which the shutter is to permit actinic radiation to be projected therethrough.

3. The apparatus of claim 2 wherein the timer automatically regulates the opening period of the shutters for a period of time of about 0.1 to about 60 seconds.

4. The apparatus of claim 3 wherein the period of time is about 10 to about 25 seconds.

5. The apparatus of claim 1 wherein a second platform is provided in said second compartment below said actinic radiation means for further posterior photocuring the photocurable composition on the support surface.

6. The apparatus of claim 1 wherein said first platform is a slidable shelf having a transparent platform formed thereon.

7. The apparatus of claim 5 wherein said first platform is a slidable shelf having a transparent platform formed thereon and said second platform is a slidable shelf.

8. The apparatus of claim 7 wherein a second shutter means is included intermediate the actinic radiation means and said second platform.

9. The apparatus of claim 8 wherein both shutter means includes a plurality of parallel rotatable members open and closed by a pneumatic-operated piston controlled by a timer which regulates the time during which each shutter is to permit actinic radiation to be projected therethrough.

10. The apparatus of claim 9 wherein a timer automatically regulates the opening period of said second shutter means for a period of time up to about 20 minutes.

11. The apparatus of claim 10 wherein the period of time is about 1 to about 5 minutes.

* * * * *